May 27, 1947. W. A. TIEDE 2,421,226
CHUCK
Filed Sept. 13, 1944 3 Sheets-Sheet 1
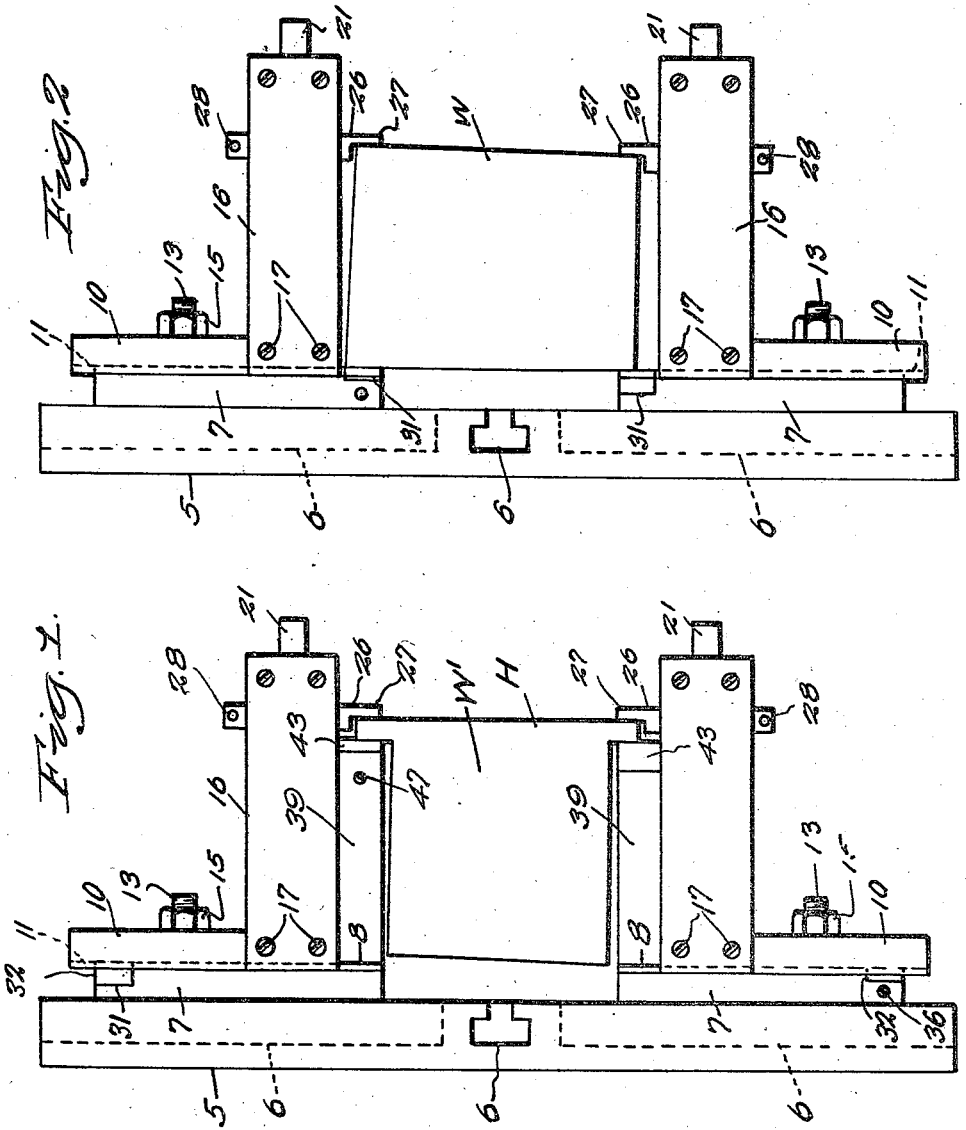
Inventor
William A. Tiede
By Clarence A. O'Brien
and Harvey B. Jackson
Attorneys

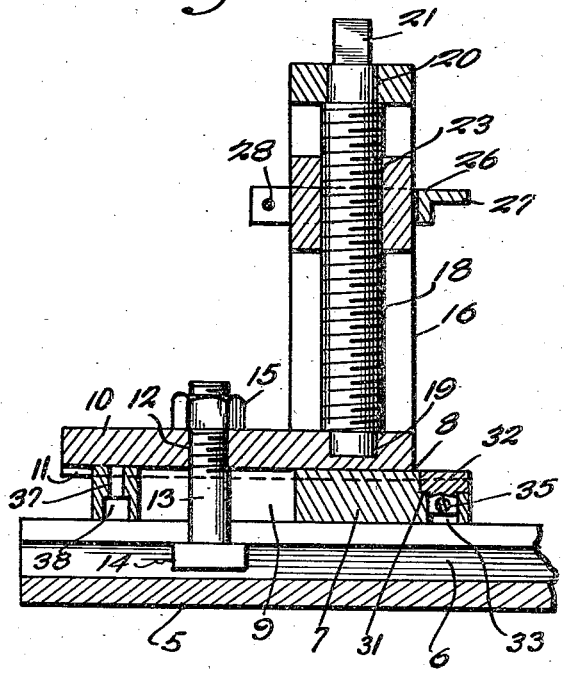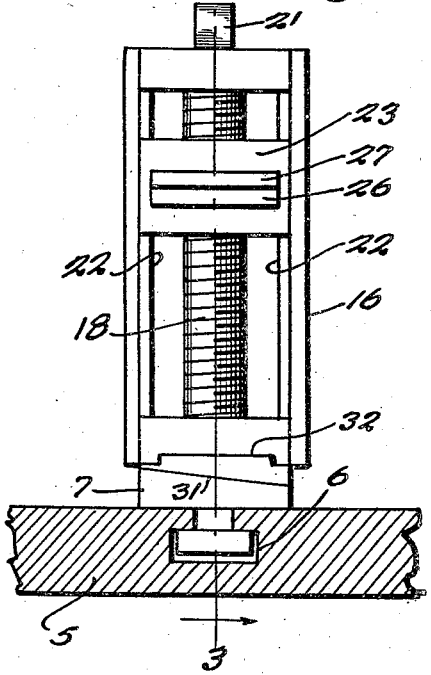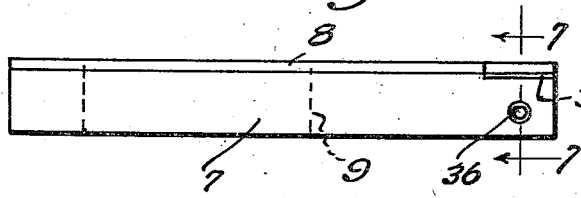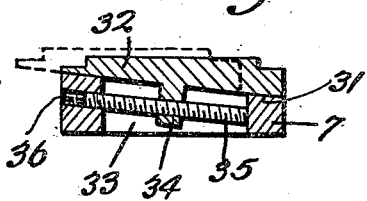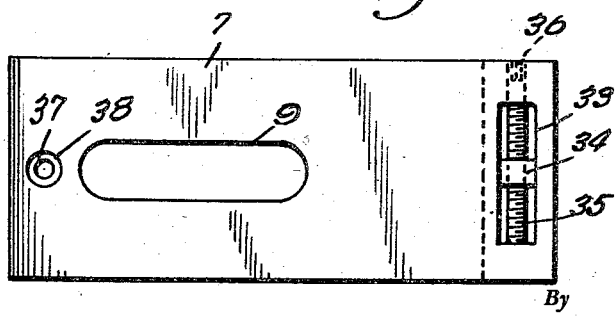

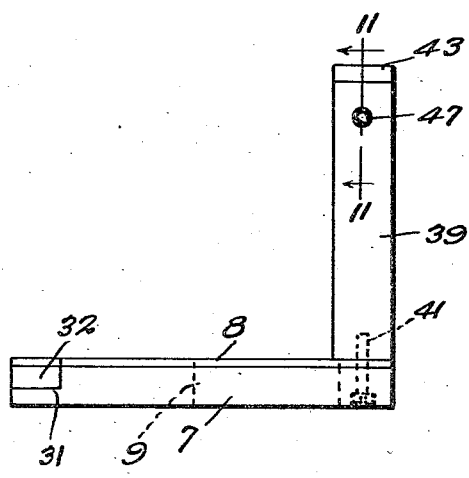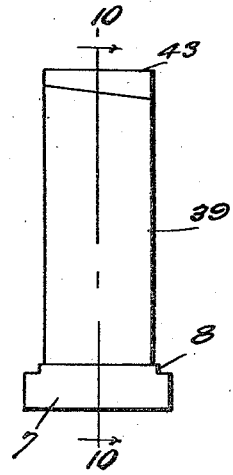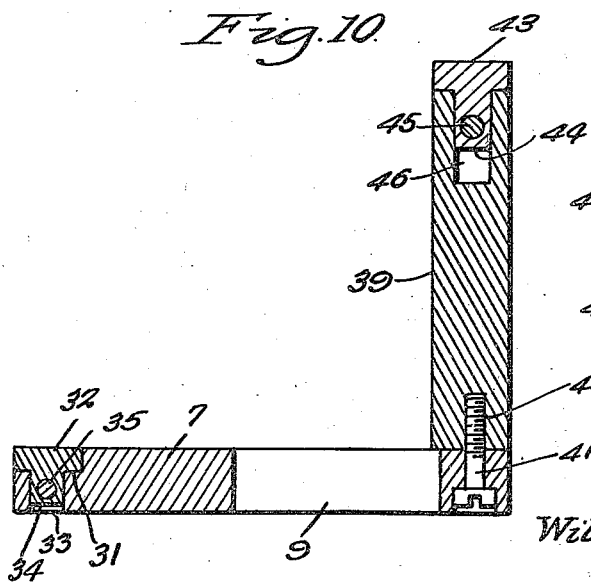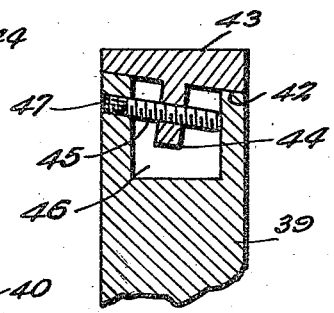
Inventor
William A. Tiede
By Clarence A. O'Brien
and Harvey B. Jacobson
Attorneys Patented May 27, 1947

2,421,226

UNITED STATES PATENT OFFICE 2,421,226

CHUCK

William A. Tiede, Bridgeport, Mich.

Application September 13, 1944, Serial No. 553,867

6 Claims. (Cl. 279—8)

1

This invention relates to an improved work-holding and driving chuck for lathes or the like, and the primary object of the invention is to provide an improved device of this kind which is capable of effectively holding headed or unheaded work having non-parallel edges or sides.

More particularly, the present invention relates to an improvement upon the type of chuck disclosed in my copending application Serial No. 512,608, filed December 2, 1943, and now Patent No. 2,360,175, issued October 10, 1944.

A more specific object of the present invention is to provide an improved chuck for holding work of the kind mentioned above and which is comparatively simple in construction and provides for a number of adjustments in a simple and expeditious manner, whereby various work may be readily and quickly clamped in place for performing operations thereon.

The present invention consists in the novel form, combination and arrangement of parts hereinafter more fully described, shown in the accompanying drawings and claimed.

In the drawings, wherein like reference characters indicate corresponding parts throughout the several views:

Figure 1 is a side elevational view showing the face plate of the head stock of a lathe or like machine equipped with clamping devices constructed in accordance with the present invention and conditioned to hold headed work having non-parallel sides or edges.

Figure 2 is a view similar to Figure 1 showing the clamping devices conditioned for holding unheaded work having non-parallel sides or edges.

Figure 3 is an enlarged fragmentary sectional view taken through the face plate and one of the clamping devices substantially on the plane of line 3—3 of Figure 4.

Figure 4 is a view looking toward the left of Figure 3.

Figure 5 is an enlarged side elevational view of the attaching base of one of the clamping devices.

Figure 6 is a bottom plan view of the device shown in Figure 5.

Figure 7 is a transverse section taken on line 7—7 of Figure 5.

Figure 8 is a side elevational view of the attaching base with the base extension attached thereto as when the clamping devices are used to clamp headed work, as shown in Figure 1.

Figure 9 is a view looking toward the left of Figure 8.

Figure 10 is an enlarged section taken substantially on the plane of line 10—10 of Figure 9.

2

Figure 11 is an enlarged fragmentary section taken substantially on the line 11—11 of Figure 8.

Referring in detail to the drawings, 5 indicates the face plate of the head stock of a lathe or like machine, and this face plate has the usual plurality of radial undercut grooves 6 in the front face thereof.

I provide a plurality of clamping devices, each of which is adapted to be operatively associated with a different one of the undercut grooves 6 of the face plate 5. Each clamping device includes an attaching base composed of an inner elongated block 7 provided at its outer side with a longitudinal rib 8 and formed with a longitudinal slot 9. The attaching base further includes an outer elongated plate member 10 having a longitudinal groove 11 in its inner face adapted to snugly slidably receive the rib 8 of the base block 7. The outer member 10 also has a transverse opening 12, and an attaching bolt 13 passes through this opening and the slot 9 in the block 7 and has its head slidably engaged in the undercut portion of a groove 6 of face plate 5. A nut 15 is threaded on the outer end of bolt 13, and it will be seen that when nut 15 is loosened, the whole assembly may be radially adjusted relative to the face plate 5, and the base members 7 and 10 may be radially adjusted relative to each other in either direction. The device further includes a U-shaped frame rigidly attached to one end of base member 10 and projecting outwardly therefrom, the free ends of the legs of frame 16 straddling the end of the base member 10 and being fastened thereto by means of screws 17 or the like. An adjusting screw 18 is journaled at one end in a socket 19 provided in the base member 10, and near its other or outer end in an opening 20 provided in the outer intermediate portion of frame member 16. The outer end of screw 18 has a polygonal extension 21 so that it may be engaged and rotated by means of a suitable tool or wrench. The legs of frame member 16 are formed on the inner sides thereof with longitudinal ribs 22, and slidably fitted in the frame 16 is a slide block 23 having side grooves receiving the ribs 22. The slide block 23 is provided with transverse openings at opposite sides of screw 18, and slidably engaged in these openings are the legs of a bifurcated clamping member 26 having a projecting work-engaging jaw 27 on the inner end thereof. The outer free ends of the legs of member 26 are adjustably connected by a transverse tightening bolt 28 extending through openings in the legs of said clamping member 26. It will thus be seen that by rotating screw 18, the block 23 may be adjusted toward or away from the face plate 5, and by loosening screw 28, the clamping member 26 may be adjusted inwardly or outwardly radially of said face plate 5.

A simple and durable construction is thus had for effectively and expeditiously adjusting the parts as set forth in my above-mentioned copending application.

In accordance with the present invention, the elongated base block 7 is reduced in thickness at one end to provide a transverse inclined seat 31 on which is slidably disposed a transversely adjustable, wedge-shaped jaw plate 32. This end of block 7 also has a transverse elongated slot 33 in which is movable a rearwardly projecting lug 34 provided on the jaw plate 32. An adjusting screw 35 is journaled in the block 7 parallel with seat 31 and is threaded through the lug 34. One end of screw 35 is exposed at one side of block 7 and is of polygonal form, as indicated at 36, for reception of a key or wrench by means of which rotation of screw 35 is effected. By reason of this construction, the jaw plate 32 may be adjusted transversely of block 7 and thereby adjusted forwardly toward or rearwardly away from the coacting jaw 27. As shown in Figure 2, opposed clamping devices may be conditioned so that the members 10 and 16 thereof are disposed outwardly of the jaws 32, thereby permitting the work W to be clamped at opposite sides between the coacting pairs of jaw members 32 and 27 even though the edge or face of the work adjacent the jaw plate 32 is at an angle to the face plate 5 as is the case when the work is provided with non-parallel sides or edges. Thus, the work may be effectively clamped where it is impractical to clamp the same between the jaws 27 and the face plate 5 in engagement with the latter.

It will be further noted that the opposite end of base block 7 is provided with a transverse opening having a relatively small smooth outer portion 37 and a smooth larger inner portion 38. A forward extension member 39 comprising an elongated block is provided for the base block 7, said extension member 39 having a threaded socket 40 in one end thereof. Thus, when the base block 7 is reversed end for end from the position of Figures 2 and 3 to the position of Figure 1, the socketed end of extension member 37 may be disposed on the end of block 7 provided with the opening 37, 38. A screw 41 is then passed through the block 7 and threaded into the socket 40 of extension member 39 to rigidly fasten the latter to said base block 7. When this is done, the head of bolt 41 is located within the larger portion 38 of the opening in the mentioned end of base block 7, and the extension member 39 projects from block 7 toward the jaw 27 of the associated frame 16, as shown in Figure 1. At its forward end, the extension member 39 is provided with an inclined seat 42 on which is disposed and transversely slidable a clamping plate 43. Clamping plate 43, which is of wedge shape, has a rearwardly projecting lug 44 through which is threaded an adjusting screw 45 journaled in the forward end of said extension member 39. The forward end of member 39 also has a recess 46 into which the lug 44 projects and is movable transversely of member 39. At one end, the screw 45 has an exposed polygonal end portion 47 with which a suitable tool or wrench may be engaged for turning screw 45 and thereby adjusting clamping plate 43 transversely of extension member 39. It will thus be seen that when extension members 39 are mounted on the base blocks 7 of opposed clamping devices, as shown in Figure 1, the adjustable clamping plates or jaws 43 of the extension members 39 will be disposed in close proximity to, as well opposed to, the jaws 27 of said clamping devices. Thus, the head portion H of the work W' may be effectively clamped between the coacting clamping elements 27 and 43 at opposite sides of the work so as to effectively support the latter by mere clamping engagement with the head thereof. This is particularly desirable in cases where the work is provided with non-parallel sides or faces, one of which is disposed adjacent the face plate 5 of the head stock and at an angle to the latter. Obviously, in order to convert the device for use, as in Figure 2, it is simply necessary to remove the extension members 39 and reverse the base blocks 7 end for end.

From the foregoing description, it is believed that the construction and operation, as well as the advantages, of the present invention will be readily understood and appreciated by those skilled in the art. It will be particularly noted that the present improvements provide for effectively clamping work having non-parallel sides or edges, one of which is arranged adjacent and at an angle to the face plate of the lathe head stock. Obviously, in such cases, it is not practical to clamp the work directly against said face plate of the head stock as contemplated in my above-mentioned co-pending application with respect to work having parallel sides or edges.

What I claim is:

1. In a chuck of the character described, a clamping device embodying an attaching base, said base including inner and outer members slidably interlocked for relative radial adjustment with respect to each other and a face plate, a slide frame rigid with and projecting outwardly from the inner end of the outer base member, a slide block in said frame having an inwardly projecting work-engaging jaw, an adjusting screw for adjusting the slide block in said frame toward or from the attaching base, the inner base member having a reduced end providing a transversely inclined seat, a wedge-shaped jaw plate slidable on said seat transversely of the inner base member and arranged in opposed relation to the work-engaging jaw of said slide block, and an adjusting screw carried by said inner base member and operatively connected to said jaw plate for adjusting the latter transversely of the inner base member and toward or away from the first-named jaw.

2. In a chuck of the character described, a clamping device embodying an attaching base, said base including inner and outer members slidably interlocked for relative radial adjustment with respect to each other and to a face plate, a slide frame rigid with and projecting outwardly from the outer base member, a slide block in said frame having an inwardly projecting work-engaging jaw, an adjusting screw for adjusting the slide block in said frame toward or from the attaching base, one end of the inner base member projecting inwardly beyond said slide frame, an extension member detachably carried by said projecting end of the inner base member and disposed at the inner side of said slide frame, said extension member projecting outwardly toward the work-engaging jaw of the slide block, and an outwardly and inwardly adjustable clamping plate on the outer end of said extension member disposed in opposed relation to said jaw of the slide block.

3. The structure defined in claim 2, wherein the inner base member is provided with a transverse opening in the inner end thereof, and a screw passing through said opening and threaded into said extension member for rigidly securing the latter to the inner base member.

4. In a chuck of the character described, a clamping device embodying an attaching base, said base including inner and outer members slidably interlocked for relative radial adjustment with respect to each other and to a face plate, a slide frame rigid with and projecting outwardly from the outer base member, a slide block in said frame having an inwardly projecting work-engaging jaw, an adjusting screw for adjusting the slide block in said frame toward or from the attaching base, one end of the inner base member projecting inwardly beyond said slide frame, an extension member detachably carried by said projecting end of the inner base member and disposed at the inner side of said slide frame, said extension member projecting outwardly toward the work-engaging jaw of the slide block, and a transversely adjustable clamping plate on the outer end of said extension member disposed in opposed relation to said jaw of the slide block, the clamping plate and the outer end of the extension member having inclined coacting faces for causing adjustment of the clamping plate toward the jaw of the slide block upon adjustment of said clamping plate transversely of the extension member.

5. The structure defined in claim 4, wherein the clamping member has an inwardly projecting lug, said extension member having a recess in which said lug is movable, and an adjusting screw journaled in the outer end of said extension member and having threaded engagement with said lug for adjusting the clamping plate transversely of the extension member and toward and away from the jaw of the slide block.

6. In a chuck of the character described, a clamping device embodying an attaching base, said base including inner and outer members slidably interlocked for relative radial adjustment with respect to each other and to a face plate, a slide frame rigid with and projecting outwardly from the outer base member, a slide block in said frame having an inwardly projecting work-engaging jaw, an adjusting screw for adjusting the slide block in said frame toward or from the attaching base, one end of the inner base member projecting inwardly beyond said slide frame, and an outwardly and inwardly adjustable clamping plate mounted on the inwardly projecting end of the inner base member and disposed in opposed relation to said jaw of the slide block.

WILLIAM A. TIEDE.

REFERENCES CITED

The following references are of record in the file of this patent:

UNITED STATES PATENTS

| Number | Name | Date |
| --- | --- | --- |
| 1,136,963 | Keith | Apr. 27, 1915 |
| 2,360,175 | Tiede | Oct. 10, 1944 |
| 1,460,385 | Lace | July 3, 1923 |

OTHER REFERENCES

"Tools, Chucks and Fixtures," by A. A. Dowd, published by Industrial Press, 1915.